United States Patent
Shah et al.

(10) Patent No.: US 11,571,652 B2
(45) Date of Patent: Feb. 7, 2023

(54) METHOD OF PURIFYING HYDROGEN SUPPLIED FROM A STORAGE CAVERN

(71) Applicants: Minish Mahendra Shah, East Amherst, NY (US); Joseph M. Schwartz, Williamsville, NY (US); Marian Simo, Spring, TX (US); Paul R. Munsterman, The Woodlands, TX (US); Werner Leitmayr, Neuburg/Donau (DE); Keith A. Craigie, N Tonawanda, NY (US); Ana Arevalo-Hidalgo, East Amherst, NY (US); Olivier Dube, Amherst, NY (US)

(72) Inventors: Minish Mahendra Shah, East Amherst, NY (US); Joseph M. Schwartz, Williamsville, NY (US); Marian Simo, Spring, TX (US); Paul R. Munsterman, The Woodlands, TX (US); Werner Leitmayr, Neuburg/Donau (DE); Keith A. Craigie, N Tonawanda, NY (US); Ana Arevalo-Hidalgo, East Amherst, NY (US); Olivier Dube, Amherst, NY (US)

(73) Assignee: PRAXAIR TECHNOLOGY, INC., Danbury, CT (US)

( * ) Notice: Subject to any disclaimer, the term of this patent is extended or adjusted under 35 U.S.C. 154(b) by 35 days.

(21) Appl. No.: 17/354,018

(22) Filed: Jun. 22, 2021

(65) Prior Publication Data

US 2022/0401872 A1    Dec. 22, 2022

(51) Int. Cl.
| | | |
|---|---|---|
| *B01D 53/047* | (2006.01) | |
| *B01D 53/04* | (2006.01) | |
| *C01B 3/56* | (2006.01) | |

(52) U.S. Cl.
CPC ....... *B01D 53/047* (2013.01); *B01D 53/0407* (2013.01); *C01B 3/56* (2013.01); *B01D 2253/102* (2013.01); *B01D 2253/108* (2013.01); *B01D 2256/16* (2013.01); *B01D 2257/7025* (2013.01); *C01B 2203/043* (2013.01); *C01B 2203/048* (2013.01)

(58) Field of Classification Search
CPC ...... B01D 53/261; B01D 46/00; B01D 53/04; B01D 53/0462; B01D 53/26; B01D 53/263
See application file for complete search history.

(56) References Cited

U.S. PATENT DOCUMENTS

| | | |
|---|---|---|
| 4,957,514 A | 9/1990 | Golden et al. |
| 5,096,470 A | 3/1992 | Krishnamurthy |
| 6,340,382 B1 | 1/2002 | Baksh et al. |

(Continued)

FOREIGN PATENT DOCUMENTS

| | | |
|---|---|---|
| FR | 3079426 | 10/2019 |
| WO | 2009/008565 A1 | 1/2009 |

*Primary Examiner* — Sharon Pregler
(74) *Attorney, Agent, or Firm* — Iurie A. Schwartz (57) ABSTRACT

The present invention is directed to a method and system of purifying hydrogen supplied from a storage cavern, particularly to removing methane and other hydrocarbons from the hydrogen withdrawn from the cavern by using selective adsorption. The adsorbed impurities can be removed from the adsorbent by increasing the temperature, reducing the pressure, or a combination of both.

20 Claims, 3 Drawing Sheets

Temperature swing adsorption process flow diagram (56) References Cited

U.S. PATENT DOCUMENTS

| | | | |
|---|---|---|---|
| 7,078,011 B2 * | 7/2006 | Morrow | C01B 3/50 423/220 |
| 8,425,149 B2 | 4/2013 | Drnevich | |
| 9,109,418 B1 | 8/2015 | Norris | |
| 9,651,199 B1 | 5/2017 | Oates et al. | |
| 9,707,603 B2 * | 7/2017 | Oates | B65G 5/00 |
| 2006/0254425 A1 | 11/2006 | Baksh et al. | |
| 2021/0023498 A1 | 1/2021 | Monereau et al. | |

* cited by examiner

Figure 1. Temperature swing adsorption process flow diagram

Figure 2. Pressure swing adsorption process flow diagram

Figure 3. Dual PSA system process flow diagram

METHOD OF PURIFYING HYDROGEN SUPPLIED FROM A STORAGE CAVERN

BACKGROUND OF THE INVENTION

Field of the Invention

The present invention relates to a method of removing hydrocarbons, including methane, contained in hydrogen withdrawn from a storage cavern. More specifically, the invention is directed to a method of selectively adsorbing methane and heavier hydrocarbons on an adsorbent that adsorbs methane and heavier hydrocarbons more strongly than it adsorbs hydrogen, even at a much higher hydrogen partial pressure and at very low partial pressures of methane and heavier hydrocarbons. This invention enables hydrogen withdrawn from a cavern to meet required purity specifications before it supplied to a pipeline or user, even if naturally occurring hydrocarbons permeate the cavern walls and contaminate the stored hydrogen.

Description of Related Art

Underground salt caverns used to store natural gas and hydrogen are known in the art. The hydrogen stored in these caverns provides additional capacity for pipelines when the demand exceeds the typical supply rate from a hydrogen producing plant. These salt caverns are very strong and nearly impermeable to contamination other than water, which is typically present in the bottom of the cavern. These caverns are produced by using water to dissolve part of an existing natural salt formation. When a salt formation is located adjacent to a hydrogen pipeline and/or hydrogen plant, a salt cavern can be used to store hydrogen.

U.S. Pat. No. 7,078,011 to Morrow et al. assigned to the Applicant and hereby incorporated by reference in its entirety describes a method of storing and supplying hydrogen to a pipeline using a salt cavern for storage. Hydrogen is injected into the cavern, where it is often contaminated with water, carbon dioxide, and potentially hydrogen sulfide. Hydrogen sulfide is removed by a hydrogen sulfide removal bed that can contain zinc oxide. A temperature swing adsorption (TSA) unit is used to remove water and carbon dioxide from the hydrogen withdrawn from the cavern. Most of the regeneration gas is recycled to the TSA inlet while a small portion can be vented. Morrow also mentions that a pressure swing adsorption (PSA) system could be used to remove water and carbon dioxide.

U.S. Pat. No. 8,425,149 to Drnevich assigned to the Applicant and hereby incorporated by reference in its entirety, describes a process in which a stagnant layer of hydrogen is maintained adjacent to the inside wall of the cavern by controlling the inlet and outlet flow rates. Limiting the flow inside the cavern minimizes disturbances in the stagnant layer, preventing any impurities entering the cavern through the walls from mixing with the withdrawn hydrogen. This maintains high hydrogen purity in the cavern outlet because any impurities entering the cavern remain in the outer stagnant layer. This patent describes a method to reduce the impact of impurities and provides a method of doing so, different than the present invention.

U.S. Pat. No. 9,109,418 to Norris describes an adsorption-based purification system for removing water and another purifier for removing solid particles. This patent explicitly specifies that the method comprises an absence of a step of removing carbon dioxide, methane, and/or hydrogen sulfide.

U.S. Pat. No. 9,651,199 to Oates et al. assigned to the Applicant and hereby incorporated by reference in its entirety describes a method to adapt to hydrocarbon impurities present in hydrogen withdrawn from a cavern. When contaminants introduced to hydrogen stored in a salt cavern cause the withdrawn hydrogen to be outside the required product purity specification, it can be mixed with higher purity hydrogen from the pipeline so that the resulting mixture of pipeline hydrogen and cavern hydrogen can meet the required purity specification. While this patent describes a solution to the problem of meeting purity specifications for hydrogen provided to the pipeline, there is no discussion of removing hydrocarbons from the withdrawn hydrogen.

U.S. Pat. No. 9,707,603 to Oates describes a method to increase hydrogen purity in a cavern by purging the cavern with a purge fluid, such as brine. The purge fluid displaces the contaminant(s) so that the hydrogen withdrawn from the cavern after purging can meet the required purity specifications. In some cases, the purge fluid can dissolve a contaminant and selectively remove it when the purge fluid is withdrawn from the cavern. This patent does describe methane as a typical impurity, but this method is difficult to implement in an operating cavern because it can lead to high hydrogen loss.

To overcome the disadvantages of the related art, it is an object of the present invention to provide an improved process and system that can remove hydrocarbon impurities from hydrogen withdrawn from a storage cavern, particularly at high hydrogen withdrawal rates.

It is another object of the invention to minimize hydrogen loss.

Other objects and aspects of the present invention will become apparent to one of ordinary skill in the art upon review of the specification, drawings and claims appended hereto.

SUMMARY OF THE INVENTION

The invention applies to hydrogen storage in underground caverns, particularly in cases where hydrocarbons, such as methane or natural gas, permeate the walls of the cavern and contaminate the stored high-purity hydrogen to the extent that the hydrogen product withdrawn from the cavern no longer meets the required purity specifications for the pipeline or end user.

The invention provides a means to remove methane and other hydrocarbons from withdrawn hydrogen using selective adsorption. The method of regenerating the adsorbent is designed to maximize overall hydrogen recovery and minimize total cost.

BRIEF DESCRIPTION OF THE FIGURES

The objects and advantages of the invention will be better understood from the following detailed description of the preferred embodiments thereof in connection with the accompanying figures wherein like numbers denote same features throughout and wherein.

DETAILED DESCRIPTION OF THE INVENTION

The present invention provides a method and system for purifying a hydrogen-containing stream withdrawn from a storage cavern. Currently, hydrogen caverns are typically equipped with systems that can remove moisture from the withdrawn hydrogen. This is because salt caverns are likely to contain some brine in the bottom of the cavern, so a hydrogen stream withdrawn from the cavern could contain moisture up to the saturation point. This is typically outside the required purity specification for the hydrogen user or pipeline being supplied, which is typically above 99% and possibly as high as 99.99% for high purity hydrogen. Therefore, adsorption-based dryers are typically added to the cavern outlet to remove this moisture. These adsorption-based dryers consist of at least two vessels containing beds of adsorbent that selectively remove moisture. While one bed is operating (i.e., is on feed), the other bed can be regenerated or wait for feed, also known as standby mode. The adsorbent bed in these vessels is designed to remove moisture and can often also remove other impurities including carbon dioxide and hydrogen sulfide. Examples of adsorbents used in the dryer vessels include alumina, silica gel, and zeolites (e.g. 3A, 4A and 13X). However, these adsorbents are generally not effective for removing methane or other higher hydrocarbons.

Figure 1:
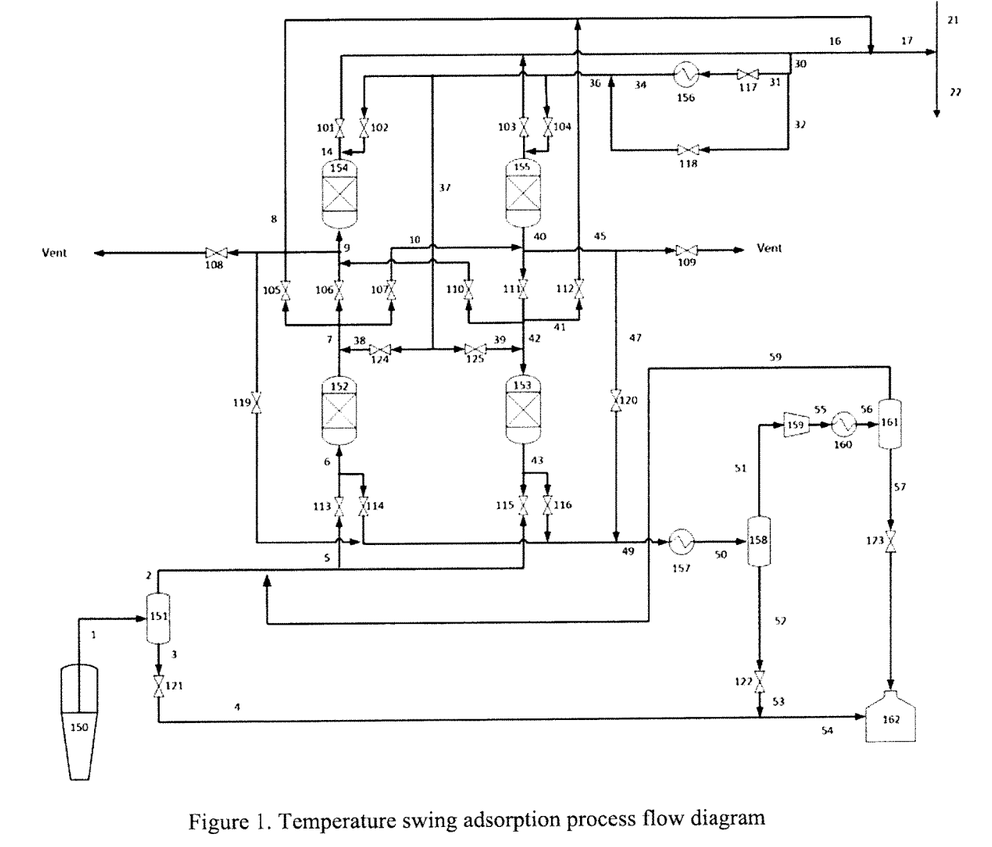
FIG. 1 is a process flow diagram illustrating an exemplary embodiment of the present invention where the hydrocarbon removal is via a temperature swing adsorption system, wherein the adsorbent bed is regenerated using regeneration gas at a higher temperature than the feed temperature.

The present invention concerns the utilization of an additional adsorption-based system to remove methane and other hydrocarbons downstream of the dryer. This adsorption-based hydrocarbon removal system consists of at least two vessels containing an adsorbent designed to remove hydrocarbons from hydrogen, wherein the adsorbent is different than the ones in the dryer beds, so that at least one bed can be purifying hydrogen while at least one other bed is being regenerated or in standby mode. The invention includes provisions for feeding any combination of a dryer bed and at least one of the hydrocarbon removal beds. Several switching valves are required to be able to utilize the invention so that each dryer outlet can be connected to different hydrocarbon removal beds. These are shown in FIG. 1. Furthermore, the invention also includes bypasses for the hydrocarbon removal beds because they will not always be required and allows for different combinations of regeneration flow, including configurations in which only one, or no, hydrocarbon removal beds are being regenerated at a given time. Several different scenarios/cases are described in Table 1, based on valve positioning to control flow to the beds. These represent different combinations of feed beds and regeneration activity that can occur at any given time in the operating cycle. For typical adsorbents, the hydrocarbon removal beds are likely to operate on a shorter cycle than the dryer beds, requiring more regeneration frequency.

The invention also includes a means for regenerating adsorption beds by recycling purified gas and flowing it countercurrent to the feed, typically after a bed is saturated with impurity. The regeneration gas can be heated and regenerate any combination of any hydrocarbon removal bed and any dryer bed, or bypass either bed and regenerate only one at any given time in the cycle. If no beds need to be regenerated at a particular time in the cycle, there is no recycle flow. A bed that is purifying feed gas cannot be regenerated at the same time.

According to an exemplary aspect of the invention as shown in FIG. 1, a method for the removal of methane and other hydrocarbons from hydrogen withdrawn from a storage cavern is provided. In FIG. 1, either dryer bed (152,153) or either hydrocarbon removal bed (154,155) can be in feed mode or in regeneration mode. Although the dryer and hydrocarbon removal systems are both shown as two-bed systems, either or both can contain more beds. Various cases representing different operating modes for different dryer and hydrocarbon removal beds are shown in Table 1, below, where the valve positions for the valves for each case are shown. The different cases shown in Table 1 are for different feed and regeneration combinations as described in the upper portion of the table.

TABLE 1

Valve Positions for Each Flow Configuration for FIG. 1

| Case | 1 | 2 | 3 | 4 | 5 | 6 | 7 | 8 |
|---|---|---|---|---|---|---|---|---|
| Dryer Feed Bed | 152 | 152 | 153 | 153 | 152 | 152 | 153 | 153 |
| Dryer Regen Bed | 153 | 153 | 152 | 152 | none | none | none | none |
| HC Removal Feed Bed | 154 | 155 | 154 | 155 | 154 | 155 | 154 | 155 |
| HC Removal Regen Bed | 155 | 154 | 155 | 154 | 155 | 154 | 155 | 154 |
| Valve Number | | | | | | | | |
| 101 | open | closed | open | closed | open | closed | open | closed |
| 102 | closed | open | closed | open | closed | open | closed | open |
| 103 | closed | open | closed | open | closed | open | closed | open |
| 104 | open | closed | open | closed | open | closed | open | closed |
| 105 | partial | partial | closed | closed | partial | partial | closed | closed |
| 106 | open | closed | closed | open | open | closed | closed | closed |
| 107 | closed | open | open | closed | closed | open | closed | closed |
| 108 | closed | partial | closed | partial | closed | partial | closed | partial |
| 109 | partial | closed | partial | closed | partial | closed | partial | closed |
| 110 | closed | open | open | closed | closed | closed | open | closed |
| 111 | open | closed | closed | open | closed | closed | closed | open |
| 112 | closed | closed | partial | partial | closed | closed | partial | partial |
| 113 | open | open | closed | closed | open | open | closed | closed |
| 114 | closed | closed | open | open | closed | closed | closed | closed |
| 115 | closed | closed | open | open | closed | closed | open | open |
| 116 | open | open | closed | closed | closed | closed | closed | closed |
| 119 | closed | closed | closed | closed | closed | open | closed | open |
| 120 | closed | closed | closed | closed | open | closed | open | closed |

The description for FIG. 1 applies to Case 1 as shown in Table 1. The exemplary method includes:

A cavern (150) is used to store hydrogen, typically to provide feed to a hydrogen pipeline when current demand exceeds supply. Hydrogen is supplied to the cavern from various production plants at required purity specifications via the hydrogen pipeline. The cavern can exist as part of a salt formation and be formed by solution mining, in which water is injected into the salt formation to dissolve a portion of it. Salt caverns can have very low permeabilities for hydrogen diffusion out of the cavern and very low permeabilities for naturally occurring impurities to penetrate the walls of the cavern. Furthermore, the cavern can include a stagnant or impermeable barrier as a result of operation conditions. The cavern, however, is expected to have brine at the bottom that will contaminate the stored hydrogen with moisture. It is also possible that carbon dioxide, natural gas, and other hydrocarbons can permeate the cavern and contaminate the stored hydrogen. A dryer is typically used to purify hydrogen withdrawn from the cavern. The dryer removes moisture and carbon dioxide but does not sufficiently remove methane or other hydrocarbons if they are present. The invention described herein is a method and apparatus to use selective adsorption to remove methane and other hydrocarbons that can contaminate the stored hydrogen product.

A hydrogen-containing stream (1) at the naturally-occurring temperature of the cavern (150), typically 80-120° F., and at an elevated pressure of about 700-2200 psig containing impurities including moisture up to about 2000 ppmv and hydrocarbons, sometimes up to about 20 ppmv, is fed to a feed separator (151). The feed separator produces a feed liquid stream (3) that includes condensed moisture from the hydrogen-containing stream (1). The feed liquid stream (3) can be periodically drained from the feed separator (151) using a feed separator drain valve (121) to produce a feed liquid drain stream (4), which is routed to a waste liquid storage tank (162).

A feed vapor stream (2) exits the top of the feed separator (151). In the configuration shown, the feed vapor stream is mixed with a compressed regen vapor stream (59) to form a first feed stream (5) and fed to a first dryer bed (152) by passing it through a first dryer feed valve (113) to produce a first dryer feed stream (6). The dryer beds are typically filled with adsorbent materials selected to remove water and carbon dioxide, but these materials are generally not effective for removing methane and other hydrocarbons. The first dryer bed (152) removes moisture from the first dryer feed (6) to produce a first dryer product stream (7). The first dryer bed (152) can also remove carbon dioxide and some other potential impurities, such as hydrogen sulfide, that might be present in the first dryer feed stream (6) but does not remove a meaningful amount of hydrocarbon impurities. When the first dryer bed (152) is being regenerated, the first feed stream (5) can be fed to an equivalent second dryer bed (153) as described in Case 3 in Table 1, for example.

The first dryer product stream (7) can be fed to a first hydrocarbon removal bed (154) through a first hydrocarbon removal bed feed valve (106) as a first hydrocarbon removal bed feed (9). In other cases, it can also be fed to a second hydrocarbon removal bed (155) through a second hydrocarbon removal bed feed valve (107) as a second hydrocarbon removal bed feed stream (10), or can bypass both hydrocarbon removal beds through a first bypass valve (105) as a hydrocarbon removal bed bypass stream (8). In most cases, the first dryer product stream (7) will be split between the hydrocarbon removal bed bypass stream (8) and one of the hydrocarbon removal bed feeds. In Case 1, the first dryer product stream (7) is split between the hydrocarbon removal bed bypass (8) and the first hydrocarbon removal bed feed stream (9).

The first hydrocarbon removal bed (154) adsorbs hydrocarbons contained in the first hydrocarbon removal bed feed stream (9), which can generally contain up to about 20 ppmv of total hydrocarbons, to produce a first hydrocarbon removal bed product stream (14) that has a hydrocarbon concentration generally much less than 1 ppmv total hydrocarbons, which is also much less than the required hydrogen pipeline purity specification, generally about 1-10 ppmv total hydrocarbons. The hydrocarbon removal beds contain an adsorbent designed to selectively adsorb methane and other hydrocarbons more strongly than they adsorb hydrogen. Such adsorbents can be selected from the group of solid adsorbents such as carbon and zeolites including CaX, BaX, SrX, CaA, BaA, SrA, Ca clinoptilolite, Ba clinoptilolite, Sr clinoptilolite, or combinations thereof. The first hydrocarbon removal bed product stream (14) passes through a first hydrocarbon removal bed product valve (101). A large portion (16), typically 85% to 90%, of the hydrocarbon removal bed product stream (14) is combined with the hydrocarbon removal bed bypass stream (8) to form a hydrogen product stream (17) that contains a lower hydrocarbon concentration than the first dryer product stream (7) and sent to the hydrogen pipeline. The hydrogen product stream (17) combines with upstream pipeline hydrogen (21) to form final pipeline hydrogen (22) that meets pipeline specifications for the concentration of hydrocarbons.

The remainder of the hydrocarbon removal bed product stream (14) is used as a regeneration stream (30) to remove adsorbed impurities from the beds. The regeneration stream can form a regeneration heater feed stream (31) that is passed through a regeneration heater valve (117) to a regeneration heater (156) to form a heated regeneration stream (34) or form a cool regeneration stream (32) that is passed through a regeneration feed valve (118). Generally, the heater will be used in the initial portion of the regeneration to heat the adsorbent being regenerated to a temperature between 50 and 150° C. to facilitate impurity removal and the heater will not be used in the latter portion of the regeneration to allow the bed to cool in preparation for the next feed cycle. The resulting regeneration feed stream (36) can be used to regenerate the first hydrocarbon removal bed (154) or the second hydrocarbon removal bed (155) or bypass the hydrocarbon removal beds and regenerate only a dryer bed as direct dryer regeneration stream (37). In all cases, a hydrocarbon removal bed can be regenerated only when it is not being used to remove hydrocarbon from a feed. In Case 1, as described here, it is used for regenerating the second hydrocarbon removal bed (155).

The regeneration feed stream (36) is sent to the second hydrocarbon removal bed (155) through second hydrocarbon removal bed regeneration valve (104) countercurrent to the hydrogen feed direction and exits as a hydrocarbon-containing regeneration stream (40) at the bottom of the second hydrocarbon removal bed (155). For a fraction of time of the regeneration step, the hydrocarbon containing regeneration stream is vented by passing it through a vent valve (109) to remove hydrocarbon from the system and for the remainder of time of the regeneration step, the hydrocarbon containing regeneration stream is fully recovered for further use. This stream is fed to the second dryer bed (153) as a second dryer bed regeneration stream (42) by passing it through a second dryer bed regeneration valve (111) in Case 1. Alternatively, it can be fed to the first dryer bed (152) using the same line as the second hydrocarbon removal bed feed stream (10) by passing it through the second hydrocarbon removal bed feed valve (107). Preferably stream (40) is heated to 200-250° C. in a heater (not shown) during the heating step of the dryer regeneration. A portion of the hydrocarbon containing regeneration stream can also be recovered as second hydrocarbon removal bypass stream (47) without regenerating a dryer bed by passing it through a second regeneration bypass valve (120). It is possible that in some steps of the system cycle, the hydrocarbon removal beds will require regeneration while neither dryer bed will require regeneration. It is also possible that the dryer will require some regeneration flow, but that it will require less flow than the hydrocarbon removal bed. In these cases, the regeneration bypass valves are used to recover the regeneration stream without passing it through a dryer bed.

The second dryer bed regeneration stream (42) passes through the second dryer bed (153) removing water and other adsorbed impurities and exits as a second final regeneration stream (43) that passes through second regeneration product valve (116) and combines with the second hydrocarbon removal bypass (47) to form a regeneration product stream (49), which is cooled in a regeneration cooler (157) to produce a cooled regeneration product stream (50). The cooled regeneration product (50) is separated into a regeneration vapor stream (51) and a regeneration liquid stream (52) in a regeneration product separator (158). The regeneration liquid (52) is drained through a regeneration liquid drain valve (122) to produce the regen liquid drain stream (53) discussed previously.

The regeneration vapor stream (51) is compressed in a regen compressor (159) to produce compressed regen vapor stream (55) at a pressure above the pressure of the feed vapor stream (2) such that after further cooling and phase separation it can mix with the feed vapor stream (2) to form the first feed stream (5) without additional compression. The compressed regen vapor (55) is cooled in a regen compressor aftercooler (160) to produce a compressed regen stream (56) that is separated into a compressed regen stream liquid stream (57), which is drained through a compressed regen stream liquid drain valve (123) and fed to the waste liquid storage tank (162), and a compressed regen vapor stream (59), which is recycled by combining it with the feed vapor stream (2). It is also possible to feed the compressed regen stream (56) to the feed separator (151).

It is desired to operate the hydrocarbon removal adsorption process such that overall hydrogen recovery is maximized. Hydrogen recovery is defined as amount of hydrogen injected in pipeline via hydrogen product stream (17) divided by amount of hydrogen in hydrogen feed (1) withdrawn from cavern averaged over a full cycle of the hydrocarbon adsorption system. This is accomplished by optimizing bypass flow in stream (8) and/or minimizing flow of vent stream via valve (109) as explained in the following examples.

Example 1

It is generally desired to maximize the hydrocarbon removal bed bypass stream (8) flow while maintaining sufficient final product purity so that hydrogen recovery is maximized, and the feed cycle time of the hydrocarbon removal beds is also maximized. Furthermore, this can reduce the size of the hydrocarbon removal beds, reducing their cost. In some cases, the purity of the first dryer product stream (7) will be sufficient to meet the product purity requirements and all of the first dryer product stream (7) can bypass the hydrocarbon removal beds. In some cases, even if the hydrogen product stream (17) contains more hydrocarbon than is allowed by the pipeline purity requirements, the product purity requirements in the pipeline can be met by mixing the hydrogen product stream (17) with pipeline hydrogen (not shown) that exceeds the purity requirements. The split between the hydrocarbon removal bed bypass stream (8) and the first hydrocarbon removal bed feed stream (9) is optimized when the bypass flow is maximized while meeting the hydrogen purity requirement in the pipeline or at the end user. The hydrocarbon contents and flows of the pipeline stream, the bypass stream (8), and the first hydrocarbon removal bed product stream (14) are each measured. The ratio of bypass flow to hydrocarbon removal bed flow can be determined based on criteria that the final pipeline hydrocarbon content meets or slightly exceeds the required purity specification. Table 2 shows parameters to calculate the optimum bypass flow.

TABLE 2

Bypass Flow Calculation Parameters

| Stream | Flow | Hydrocarbon Fraction | Hydrocarbon Flow |
|---|---|---|---|
| Upstream Pipeline Hydrogen (21) | $F_u$ | $H_u$ | $F_u H_u$ |
| Final Pipeline Hydrogen (22) | $F_f$ | $H_f$ | $F_f H_f$ |
| Bypass (8) | $F_b$ | $H_b$ | $F_b H_b$ |
| Hydrocarbon Bed Feed (9) | $F_a$ | $H_a$ | $F_a H_a$ |
| Hydrocarbon Bed Product (14) | $F_h$ | $H_h$ | $F_h H_h$ |
| Regeneration gas (30) | $F_r$ | $H_r$ | $F_r H_r$ |
| Dryer Product (7) | $F_d$ | $H_d$ | $F_d H_d$ |

The final flow in the pipeline after hydrogen from the cavern is added to it will be:

Total Final Flow=$F_f=F_u+F_h-F_r$

Total Final Hydrocarbon Flow=$F_f H_f=F_u H_u+F_b H_b+F_h H_h-F_r H_r$

Dryer Product Flow=$F_d=F_a+F_b$

By measuring all flows and hydrocarbon concentrations, the optimum split between the bypass and the adsorbent bed feed can be calculated. Because the hydrocarbon bed feed and the bypass come from the same stream, they will both have the same hydrocarbon fraction, $H_b=H_a$.

Furthermore, because the hydrocarbon concentration is small, it can be assumed that hydrocarbon bed feed flow and hydrocarbon bed product flow are equal because the amount of flow removed by bed is a negligible fraction of the total flow.

$F_a=F_h$

Since regeneration gas is obtained from the hydrocarbon removal bed product (14), $H_r=H_h$ Furthermore, it is assumed that flow of regeneration stream (30) is 10% of the flow of hydrocarbon removal bed feed (9). Thus, $F_r=0.1F_a$ It is necessary that the final hydrocarbon fraction in the pipeline after feeding the cavern hydrogen product meets the required purity specification for the pipeline so $$\frac{FuHu + FbHb + FhHh - FrHr}{Fu + Fb + Fh - Fr} < Hf =$$

Specified hydrocarbon concentration

Solving for $F_b$ gives:

$$Fb < \frac{Fu(Hf - Hu) + 0.9Fd(Hf - Hh)}{Hb - 0.1Hf - 0.9Hh}$$

Example 1

Assume the following measurements and a pipeline purity specification of 1 ppmv total hydrocarbon maximum (i.e. $H_f=1$):

TABLE 3

Flow and hydrocarbon concentrations for Example 1

| Stream | Flow (MMSCFD) | Hydrocarbon Fraction (ppm) | Hydrocarbon Flow (SCFD) |
|---|---|---|---|
| Upstream Pipeline Hydrogen (21) | $F_u = 100$ | $H_u = 0.5$ | $F_u H_u = 50$ |
| Bypass (8) | $F_b$ | $H_b = 8$ | $8 F_b$ |
| Hydrocarbon Bed Feed (9) | $F_a$ | $H_a = 8$ | $8 F_a$ |
| Hydrocarbon Bed Product (14) | $F_h = F_a$ | $H_h = 0.1$ | $0.1 F_h$ |
| Dryer Product (7) | $F_d = 20$ | $H_d = 8$ | $F_d H_d = 160$ |
| Regeneration Gas (30) | $F_r = 0.1 F_a$ | $H_r = 0.1$ | $0.01 F_a$ |

Using the equation for $F_b$ above, $F_b < 8.47$ MMSCFD, so $F_a > 11.53$ MMSCFD to achieve a hydrocarbon concentration in the pipeline of 1 ppmv. A larger bypass flow will result in the pipeline purity failing to meet the required purity while a smaller bypass will lead to a slight increase in hydrogen loss due to unnecessary hydrocarbon removal bed usage. As utilized herein, hydrogen loss shall be understood to mean hydrogen withdrawn from cavern, less the hydrogen injected into hydrogen product steam (17) averaged over a full cycle of operation. A bypass flow slightly below the calculated maximum value is desired to allow for upsets or slight changes in composition of one of the streams.

Example 2

Hydrocarbon concentration in the hydrocarbon-containing regeneration stream will vary during the regeneration step with changes in temperatures. During initial heating period of the regeneration step, hydrocarbon will desorb from the hydrocarbon removal bed and the concentration of hydrocarbon in the hydrocarbon-containing regeneration stream will be highest. For a fraction of time during regeneration step when hydrocarbon concentration in the hydrocarbon-containing regeneration stream is highest, the hydrocarbon-containing regeneration stream (40) is vented by passing it through a vent valve (109) to remove hydrocarbon from the system. The flow through the vent valve is timed to maximize the hydrocarbon content in the vented gas to maximize hydrogen recovery while still removing the hydrocarbon from the system. Once the hydrocarbon content in the hydrocarbon-containing regeneration stream (40) is low enough, the vent valve (109) is closed and the regeneration stream is fully recovered.

TABLE 4

Variables for Hydrogen Recovery

| Stream | Flow averaged over one cycle on dry basis, MMscfd |
|---|---|
| Hydrogen feed (1) from cavern | $F_c$ |
| Hydrogen feed to dryer (6) | $F_e$ |
| Dryer Product (7) | $F_d$ |
| Hydrocarbon Bed Feed (9) | $F_a$ |
| Hydrocarbon Bed Product (14) | $F_h$ |
| Regeneration Gas (30) | $F_r$ |
| Hydrogen vented through valves (108) and (109) | $F_v$ |
| Recycled regen vapor (59) | $F_y$ |
| Hydrogen product stream (17) | $F_p$ |

Mass balance for hydrogen product flow can be written as:

$F_p = F_h + F_b - F_r$

Following assumptions are substituted from Example 1:

$F_h = F_a$; $F_a + F_b = F_d$; $F_r = 0.1 F_a$ $F_p = F_d - 0.1 F_a$

Mass balance for cavern feed and recycle flow can be written as:

$F_e = F_c + F_y$ $F_y = F_r - F_v$

Since dryer feed and product flows on dry basis are same, $F_e = F_d$.

Assuming that during regeneration steps, vent valves (108) and (109) are opened 20% of time to vent hydrocarbon-rich regeneration stream (40), $F_v = 0.2 F_r$ and $F_y = 0.8 F_r = 0.08 F_a$ Substituting these values, cavern feed flow can be calculated by, $F_c = F_d - 0.8 F_r = F_d - 0.08 F_a$ Overall hydrogen recovery $= F_p / F_c = (F_d - 0.1 F_a)/(F_d - 0.08 F_a)$ Assuming same values for flows and hydrocarbon concentration listed in Table 3, bypass flow $F_b < 8.47$ was estimated. Applying ~5% margin, if bypass flow Fb is fixed at 8 MMscfd, $F_a = 12$ MMscfd. Hydrogen recovery from equation above will be 98.7%. In the extreme case when bypass flow $F_b = 0$ and $F_a = 20$, the overall hydrogen recovery will be 97.8%.

With the examples described above, it is expected that overall hydrogen recovery of 97% and preferably >98% is achieved.

Another aspect of the invention is a bypass line so that the regeneration feed stream (36) can bypass the hydrocarbon removal beds (154,155) as a hydrocarbon removal bypass (37) to flow directly into a dryer bed as previously described.

It is also possible to combine the hydrocarbon removal beds (154,155) with the dryer beds (152,153). However, it is often not desirable to do that because the optimum feed and regeneration times of the different types of bed are different in most cases. Furthermore, combining the beds eliminates the ability to bypass the hydrocarbon removal beds.

Another alternative is to add a second heater for the stream being used to regenerate a dryer bed. This is particularly important when the dryer regeneration requires higher temperature than the exit temperature of the hydrocarbon-containing regeneration stream.

Another alternative is to combine the vent valves (108) and (109) and the regeneration bypass valves (119) and (120).

Another alternative is to perform the regeneration of the hydrocarbon removal bed at a lower pressure than the feed pressure. This embodiment requires less heating of the regeneration stream but requires more compression to recycle it.

Another alternative is to compress the regeneration stream (30) instead of compressing the regeneration vapor stream (51).

Another alternative is to use the compressor that fills the cavern to compress the regeneration or recycled stream.

Another example of a process using lower pressure for regeneration is a process that includes a pressure swing adsorption (PSA) system, such as what is described in U.S. Pat. No. 6,340,382 to Baksh et al. and which is incorporated herein by reference. Compared to the PSA described in U.S. Pat. No. 6,340,382, the PSA system used in this invention could contain much less or no adsorbent designed to remove moisture and would focus on an adsorbent to remove hydrocarbons, such as CaX zeolite. An example of this is shown with reference to FIG. 2.

Figure 2:
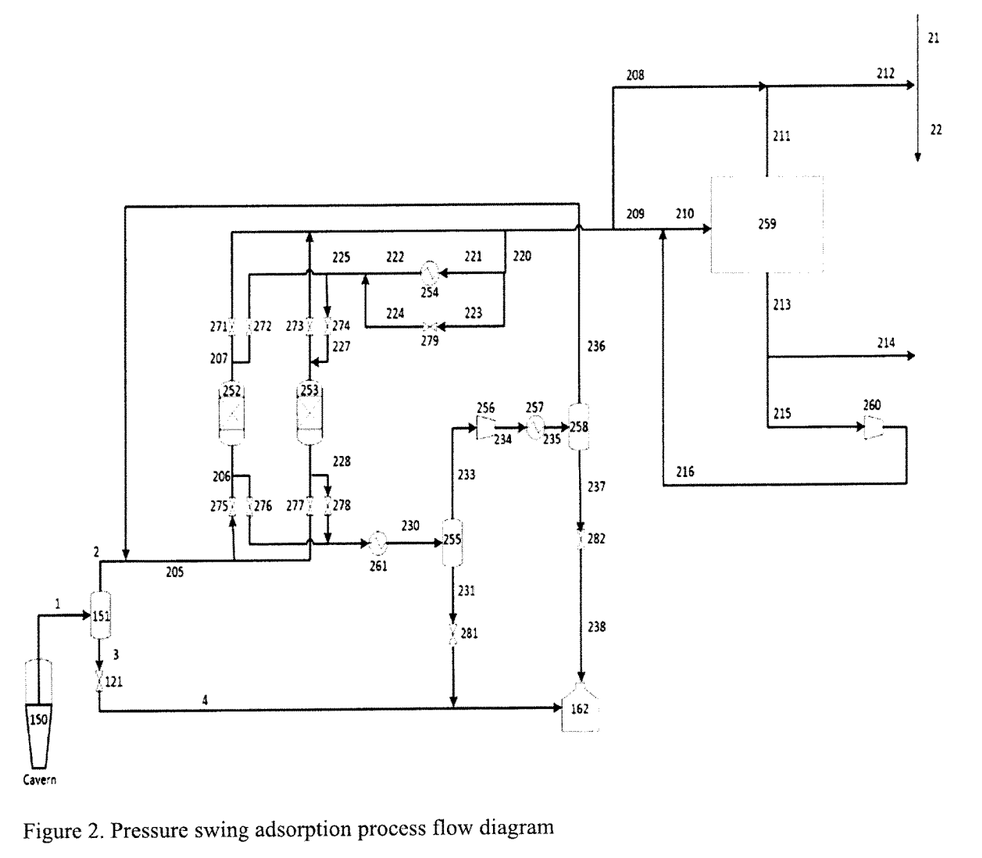
FIG. 2 is a process flow diagram illustrating another exemplary embodiment of the present invention where the hydrocarbon removal is via a pressure swing (PSA) adsorption system, wherein the bed is regenerated at a pressure lower than the feed pressure.

As in the process and apparatus described in FIG. 1, a hydrogen-containing stream (1) at the naturally-occurring temperature of the cavern (150), typically 80-120° F., and at an elevated pressure of about 700-2200 psig containing impurities including moisture up to about 2000 ppmv and hydrocarbons, typically up to about 20 ppmv, is fed to a feed separator (151). The feed separator produces a feed liquid stream (3) comprising condensed moisture from the hydrogen-containing stream (1). The feed liquid stream (3) can be drained from the feed separator (151) using a feed separator drain valve (121) to produce a feed liquid drain stream (4), which is routed to a waste liquid storage tank (162).

A feed vapor (2) exits the top of the feed separator (151). In the configuration shown, the feed vapor mixes with a regeneration recycle stream (236) to form a dryer feed stream (205), which is fed to a first dryer (252) by passing it through a first dryer feed valve (275) to produce a dryer feed stream (206). The first dryer (252) removes moisture and potentially other impurities including carbon dioxide from the dryer feed (206) to produce a dryer product stream (207). The dryer product stream (207) passes through a first dryer product valve (271) and is split between a dryer regeneration stream (220), a PSA bypass stream (208), and a PSA feed stream (209). The PSA feed (209) is combined with a compressed tail gas (216) to form a combined PSA feed stream (210), which is fed to a PSA (259). The PSA produces a purified hydrogen stream (211) at elevated pressure and a tail gas (213) that contains the methane and other impurities from the combined PSA feed stream (210) at low pressure, typically less than 50 psig. The purified hydrogen stream (211) mixes with the PSA bypass (208) to form a hydrogen product (212) that is fed to a hydrogen pipeline or user. A portion of the tail gas (213) is vented as a waste stream (214) to remove hydrocarbons and other impurities removed in the PSA (259) from the system. The waste stream (214) can be used as a fuel. The remainder of the tail gas (213) is recycled as a tail gas recycle stream (215) and compressed in a tail gas recycle compressor (260) to slightly above the PSA feed (209) pressure so that it can combine with the PSA feed stream (209). In general, it is desired to minimize the waste stream (214) flow to maximize hydrogen recovery. This can be done by allowing the concentration of methane and other impurities to build in the combined PSA feed (210) to levels much higher than the impurity concentration in the PSA feed (209) because the PSA can effectively remove impurities at concentrations much higher than what is expected in the PSA feed stream (209). Furthermore, because the compressed tail gas (216) has a much lower flow rate than the PSA feed, the hydrocarbon concentration in the compressed tail gas (216) can be orders of magnitude higher than in the PSA feed stream (209) while maintaining sufficient hydrogen product (212) purity. This minimizes the flow of the waste (214), and attaining hydrogen recovery of at least 99%.

It is generally desired to maximize the PSA bypass (208) flow while maintaining sufficient final product purity so that hydrogen recovery is maximized and recycle compression power and corresponding cost is minimized. In some cases, the purity of the dryer product stream (207) will be sufficient to meet the product purity requirements and all of the dryer product stream (207) can bypass the PSA (259). In some cases, the product purity requirements in the pipeline can be met by mixing the hydrogen product stream (212) with pipeline hydrogen that exceeds the purity requirements. This allows the bypass flow to increase further relative to the PSA feed flow. In general, it is desirable to maximize the bypass flow while still meeting the purity specification in the pipeline after the hydrogen product (212) mixes with the hydrogen already in the pipeline.

The dryer regeneration stream (220) is used to remove moisture and other impurities removed in the dryer from the adsorbent. In the initial portion of the regeneration cycle, the dryer regeneration stream (220) becomes a regeneration heater feed stream (221), which is heated in a regeneration heater (254) to produce a hot regeneration gas stream (222). Later in the cycle, once the impurities have been removed, the dryer regeneration stream becomes a regeneration heater bypass stream (223) and passes through a regeneration heater bypass valve (279) to form a cool regeneration gas stream (224). It is also possible to split the flow between the regeneration heater feed stream (221) and regeneration heater bypass stream (223) to produce a regeneration gas stream (225) at an intermediate temperature.

In the configuration described above, the first dryer (252) is adsorbing impurities while a second dryer (253) is being regenerated. These roles will reverse at other points in the overall cycle and it is possible that the adsorption step can take more time than the regeneration, so that neither bed will be on a regeneration step for parts of the overall cycle. The second dryer (253) is regenerated by passing the regeneration gas stream (225) through a second dryer regeneration valve (274) to produce a second dryer regeneration gas stream (227). In the initial portion of the regeneration cycle, the second dryer regeneration gas stream (227) will be at a higher temperature than the second dryer (253), so that it heats the adsorbent to about 200-250° C., causing adsorbed impurities to be removed and exit the dryer as part of a second dryer regeneration product stream (228), which passes through a second dryer regeneration product valve (278) and is cooled in a regeneration gas cooler (261) to produce a cooled regeneration product (230). The cooled regeneration product stream (230) is fed to a regeneration product separator (255) that separates a regeneration condensate stream (231) from a regeneration vapor stream (233). The regeneration condensate stream (231) can be drained through a regeneration separator drain valve (281) and routed to the waste liquid storage tank (162). The regeneration vapor is compressed in a regeneration recycle compressor (256) to form a hot compressed regeneration recycle gas stream (234), which is cooled in a compressor aftercooler (257) to produce a compressed regeneration recycle stream (235), which is fed to a compressed regeneration recycle separator (258). The compressed regeneration recycle separator (258) produces a regeneration recycle condensate stream (237), which can be drained through a compressed regeneration recycle separator drain valve (282) and routed to the waste liquid storage tank (162). The vapor produced by the compressed regeneration recycle separator (258) is the regeneration recycle stream (236) described earlier.

Different cases are described in the top portion of Table 5. The valve positions for each valve for each case are shown in the bottom portion of Table 5.

TABLE 5

Valve Positions for Each Flow Configuration for FIG. 2

| Case | 1 | 2 | 3 | 4 | 5 | 6 |
|---|---|---|---|---|---|---|
| Dryer Feed Bed | 252 | 253 | 252 | 253 | 252 | 253 |
| Dryer Regen Bed | 253 | 252 | 253 | 252 | none | none |
| Regen Temp | heated | heated | cool | cool | | |

TABLE 5-continued

Valve Positions for Each Flow Configuration for FIG. 2

| Case | 1 | 2 | 3 | 4 | 5 | 6 |
|---|---|---|---|---|---|---|
| Valve Number | | | | | | |
| 271 | open | closed | open | closed | open | closed |
| 272 | closed | open | closed | open | closed | closed |
| 273 | closed | open | closed | open | closed | open |
| 274 | open | closed | open | closed | closed | closed |
| 275 | open | closed | open | closed | open | closed |
| 276 | closed | open | closed | open | closed | closed |
| 277 | closed | open | closed | open | closed | open |
| 278 | open | closed | open | closed | closed | closed |
| 279 | closed | closed | open | open | closed | closed |

Another alternative is to combine the feed separator (151) with the compressed regeneration recycle separator (258) into a single bed.

Figure 3:
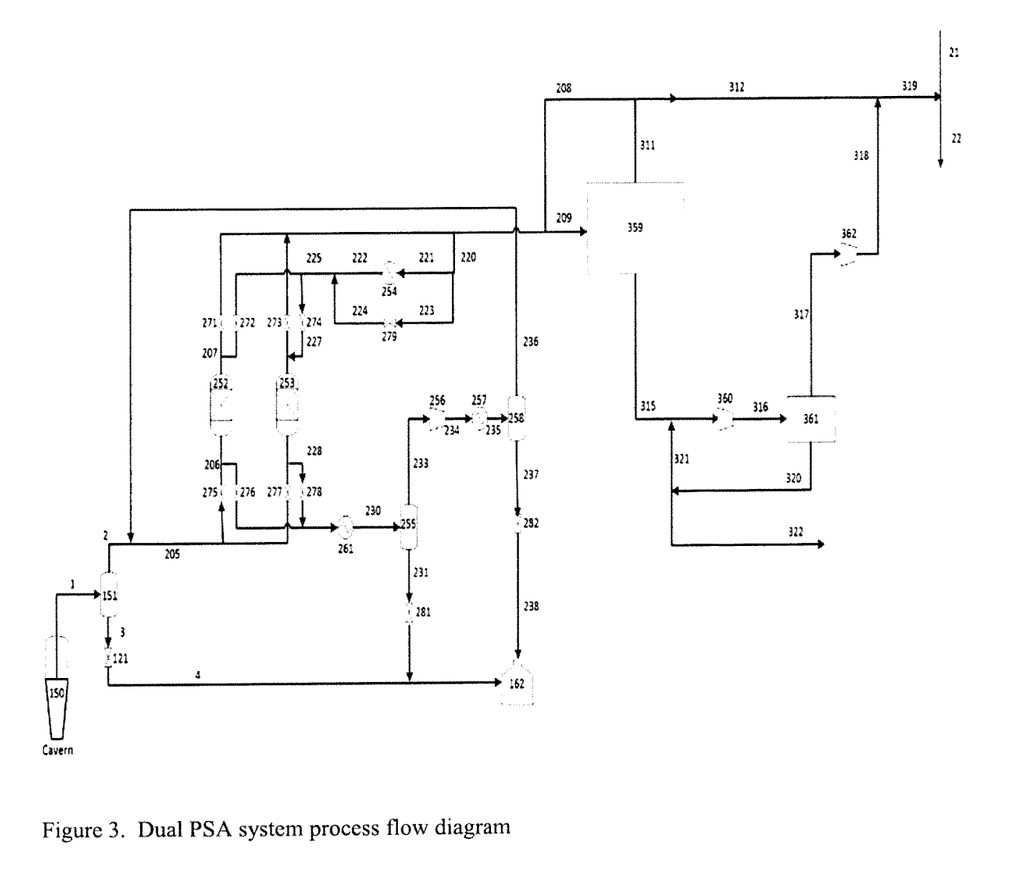
FIG. 3 is a process flow diagram illustrating yet another exemplary embodiment of the present invention where dual PSA system is used for the hydrocarbon removal.

Another alternative is to use a second adsorption system as described in FIG. 3. The PSA feed stream (209), as described in FIG. 2, is fed to a large PSA (359), which is larger than a small PSA (361). The large PSA has a capacity that is sufficient for about 5-10 times as much feed flow as the small PSA. Hydrogen product (311) is recovered from the large PSA and mixes with the PSA bypass (208). A large PSA tail gas stream (315) mixes with a portion (321) of a small PSA tail gas stream (320) and is compressed in a first tail gas compressor (360) to form a small PSA feed stream (316) that is fed to the small PSA (361). The small PSA (361) is smaller than the large PSA (359), has a lower feed flow rate, and operates at a lower pressure, typically about 150-250 psig compared to the large PSA, which operates at about 800-1100 psig. The small PSA (361) splits the small PSA feed stream (316) into a small PSA hydrogen product stream (317) and a small PSA tail gas stream (320). A portion (321) of the small PSA tail gas stream (320) is recycled to the small PSA while the remainder forms a waste stream (322). The small PSA hydrogen product (317) is compressed in a second hydrogen compressor (362) and mixed with the PSA bypass (208) and the large PSA hydrogen product (311) to form a two-stage hydrogen product (319), similar to the hydrogen product (212) from FIG. 2.

While the invention has been described in detail with reference to specific embodiments thereof, it will become apparent to one skilled in the art that various changes and modifications can be made, and equivalents employed, without departing from the scope of the appended claims.

What is claimed is:

1. A method for the removal of hydrocarbons from a hydrogen-containing stream (1) withdrawn from a storage cavern, comprising:
routing the hydrogen-containing stream to a first adsorption system having at least one dryer bed that selectively removes moisture from the hydrogen stream to produce a dryer product stream with lower moisture content than the hydrogen-containing stream; and
subsequently routing at least a portion of the dryer product stream to a second adsorption system having at least one hydrocarbon removal bed that selectively removes hydrocarbons from the dryer product stream to produce a hydrogen product stream that contains a lower hydrocarbon concentration than the dryer product stream.

2. The method of claim 1, further comprising providing at least a portion of the hydrogen product to a hydrogen pipeline, wherein the hydrogen product has a purity of at least 99%.

3. The method of claim 1, wherein a portion of the dryer product is split as a by-pass stream which combines with the hydrogen product stream.

4. The method of claim 3, wherein a flow of the by-pass stream is maximized to provide a hydrogen recovery of 97% or higher.

5. The method of claim 1, wherein the hydrocarbon removal bed is regenerated by increasing the temperature of said hydrocarbon removal bed by routing a portion of the hydrogen product stream as a regeneration gas and obtaining hydrocarbon containing regeneration gas.

6. The method of claim 5, where the regeneration gas exiting at least one hydrocarbon removal bed is vented for a fraction of time during the regeneration step when hydrocarbon concentration is highest to provide a hydrogen recovery of 97% or higher.

7. The method of claim 5, further comprising routing a portion of the hydrocarbon containing regeneration gas to regenerate an adsorbent in the at least one dryer bed and a remainder is split as a second by-pass stream.

8. The method of claim 7, wherein the regeneration gas exiting the at least one dryer bed and the second by-pass stream are combined, compressed and mixed with the hydrogen-containing stream before it is routed to the at least one dryer.

9. The method of claim 3, wherein the second adsorption system is a pressure swing adsorption system having at least one hydrocarbon removal bed, wherein the hydrocarbon removal bed is being regenerated by reducing the pressure of said hydrocarbon removal bed and recovering a tail gas stream containing hydrocarbons.

10. The method of claim 9, further comprising compressing and recycling a portion of the tail gas to the first pressure swing adsorption system.

11. The method of claim 9, wherein the tail gas is compressed and fed to a second pressure swing adsorption system operating at a lower pressure than the first pressure swing adsorption system and recovering a second tail gas stream containing hydrocarbons.

12. The process of claim 11, wherein the hydrogen product from the second pressure swing adsorption system is compressed and combined with the hydrogen product from the first pressure swing adsorption unit and a portion of the second tail gas stream from the second pressure swing adsorption system is combined with the tail gas from the first pressure swing adsorption system and compressed and recycled as feed of the second adsorption system.

13. The method of claim 1, wherein the dryer bed of the first adsorption system and the hydrocarbon removal bed of the second adsorption system are contained in the same vessel or group of vessels.

14. The method of claim 1 wherein the adsorbent in the second adsorption system is selected from the group consisting of solid adsorbents such as carbon and zeolites including CaX, BaX, SrX, CaA, BaA, SrA, Ca clinoptilolite, Ba clinoptilolite, Sr clinoptilolite, or combinations thereof.

15. The method of claim 1, wherein the adsorbent in the first adsorption system is selected from the group consisting alumina, silica gel, molecular sieves including 3A, 4A and 13X zeolite, and alkali promoted alumina.

16. An apparatus for the removal of hydrocarbons from a hydrogen-containing stream withdrawn from a storage cavern, comprising:
a first adsorption system having at least one dryer receiving the hydrogen-containing stream to selectively remove moisture from the hydrogen-containing stream to produce a dryer product stream with a lower moisture content than the hydrogen-containing stream; and a second adsorption system having at least one hydrocarbon removal bed to receive at least a portion of the dryer product stream thereby selectively removing hydrocarbons from the dryer product stream to produce a hydrogen product stream that contains a lower hydrocarbon concentration than the dryer product stream.

17. The apparatus of claim 16, further comprising a hydrogen pipeline to receive at least a portion of the hydrogen product, wherein the hydrogen product has a purity of at least 99%.

18. The apparatus of claim 16, further comprising a at least one pressure swing adsorption to receive a hydrogen product feed for further purification.

19. The apparatus of claim 16, wherein the adsorbent in the second adsorption system is selected from the group consisting of carbon and zeolites including CaX, BaX, SrX, CaA, BaA, SrA, Ca clinoptilolite, Ba clinoptilolite, Sr clinoptilolite, or combinations thereof.

20. The method of claim 1, wherein the dryer materials is selected from the group of solid adsorbents consisting of alumina, silica gel, and zeolites including 3A, 4A and 13X.

\* \* \* \* \*